(12) United States Patent
Li et al.

(10) Patent No.: US 7,779,550 B2
(45) Date of Patent: Aug. 24, 2010

(54) MICROMETER-BASED MEASURING SYSTEM AND METHOD OF USING SAME

(75) Inventors: Lei Li, Shenzhen (CN); Zhi Cheng, Shenzhen (CN); Ping Chen, Shenzhen (CN); Ji-Wen Yang, Shenzhen (CN); Lin-Sen Dong, Shenzhen (CN); Chang-Fa Sun, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 235 days.

(21) Appl. No.: 11/945,512

(22) Filed: Nov. 27, 2007

(65) Prior Publication Data

US 2008/0155846 A1 Jul. 3, 2008

(30) Foreign Application Priority Data

Dec. 29, 2006 (CN) ........................ 2006 1 0064624

(51) Int. Cl.
*G01B 5/20* (2006.01)

(52) U.S. Cl. ............................................ 33/533; 33/549
(58) Field of Classification Search .................. 33/533, 33/549–553

See application file for complete search history.

(56) References Cited

FOREIGN PATENT DOCUMENTS

JP          2000234923 A      8/2000

*Primary Examiner*—Yaritza Guadalupe-McCall
(74) *Attorney, Agent, or Firm*—Jeffrey T. Knapp

(57) ABSTRACT

A measuring system (100) for flatness degree measurement includes a measuring instrument (10) and a processing device (20). The measuring instrument has a base (12), a guide column (14), a sliding member (16), a digital micrometer (18) and a holding member (19). The guide column is vertically attached to the base. The sliding member is moveably attached to the guide column. The digital micrometer is firmly fastened to the sliding member. The holding member is configured for fixing a workpiece (40) and has a reference-standard surface formed thereon. The processing device electronically connects with the digital micrometer. The processing device receives a plurality of measured values from the digital micrometer and displays a testing result after processing the measured values.

19 Claims, 3 Drawing Sheets

MICROMETER-BASED MEASURING SYSTEM AND METHOD OF USING SAME

BACKGROUND OF THE INVENTION

1. Field of the Invention

The present invention relates to measuring systems and, particularly, to a measuring system with a digital micrometer and a method using the same.

2. Description of Related Art

In industrial production, it is often necessary to do a flatness degree measurement for a workpiece so as to ensure the dimension precision of the products. Manufacturers generally use a single micrometer or a three-dimensional measuring apparatus to measure the degree of flatness of the workpieces.

Although micrometers are light and handy, when a surveyor/inspector uses a single micrometer to measure the workpieces, the surveyor usually needs to read and record the parameters by hand, which make the measuring process time consuming. Also, man-made errors can easily be made when reading such measurements. In addition, the surveyor needs to determine whether the dimension of the workpiece is acceptable or not. As such, not only the work burden of the surveyor is increased, it also increases the time needed for the measuring process.

The three-dimensional measuring apparatus is generally large and complex, so that it tends to be hard to move. Therefore, the three-dimensional testing apparatus is suitable for placement in a laboratory to measure small quantities of samples, but it is not generally suitable for measuring products in large-scale production.

Therefore, a new measuring system is desired in order to overcome the above-described problems.

SUMMARY OF THE INVENTION

In one embodiment thereof, a measuring system for flatness degree measurement includes a measuring instrument and a processing device. The measuring instrument has a base, a guide column, a sliding member, a digital micrometer and a holding member. The guide column is vertically attached to the base. The sliding member is moveably attached to the guide column. The digital micrometer is firmly fastened to the sliding member. The holding member is configured for fixing a workpiece and has a reference-standard surface formed thereon. The processing device electronically connects with the digital micrometer. The processing device receives a plurality of measured values from the digital micrometer and displays a testing result after processing the measured values.

Other advantages and novel features will become more apparent from the following detailed description when taken in conjunction with the accompanying drawings.

BRIEF DESCRIPTION OF THE DRAWINGS

Many aspects of the measuring system can be better understood with reference to the following drawings. The components in the drawings are not necessarily drawn to scale, the emphasis instead being placed upon clearly illustrating the principles of the present measuring system. Moreover, in the drawings, like reference numerals designate corresponding parts throughout the several views.

DETAILED DESCRIPTION OF THE INVENTION

Figure 1:
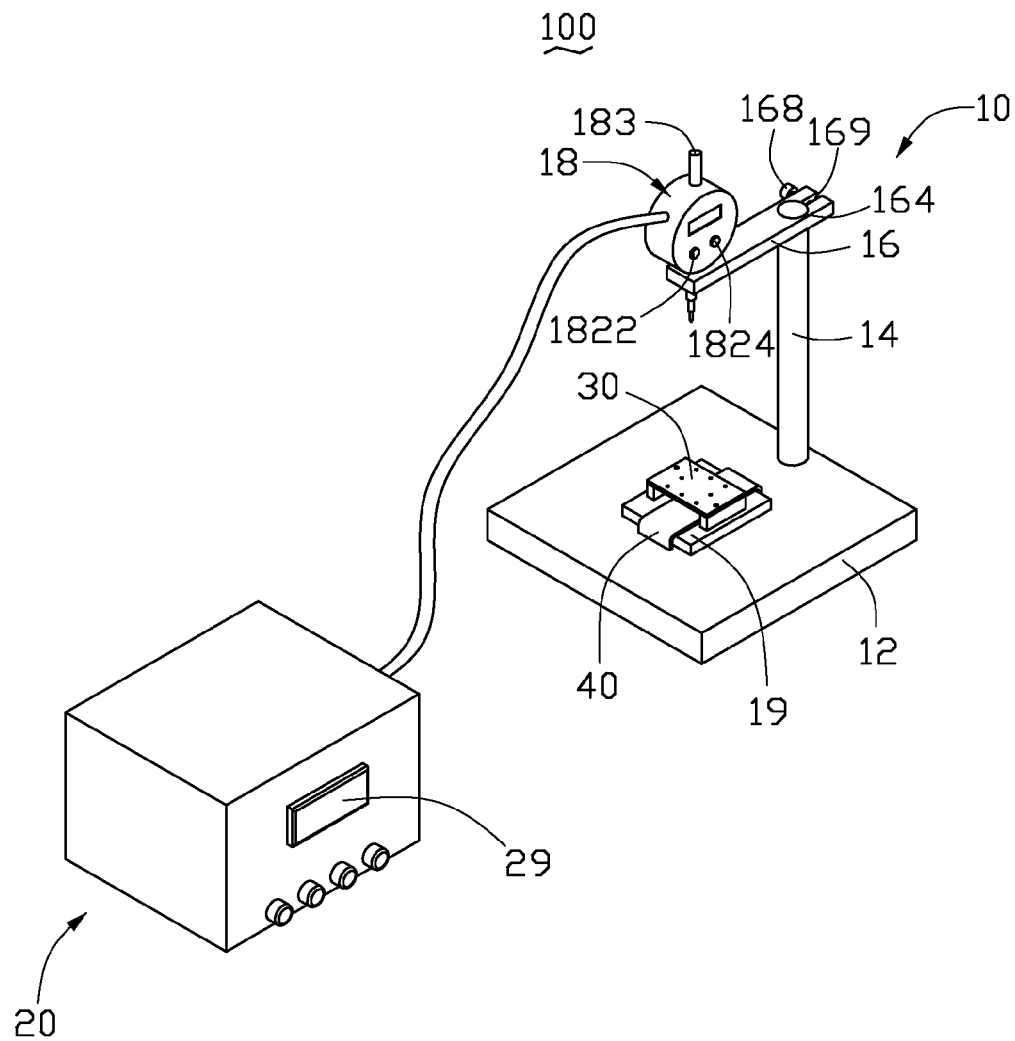
FIG. 1 is an assembled, isometric view of a measuring system, in accordance with a present embodiment.

Referring now to FIG. 1, the measuring system 100 includes a measuring instrument 10 and a processing device 20 connected/linked with the measuring instrument 10, in accordance with a present embodiment.

The measuring instrument 10 includes a base 12, a guide column 14, a sliding member 16, a digital micrometer 18 and a holding member 19.

Figure 2:
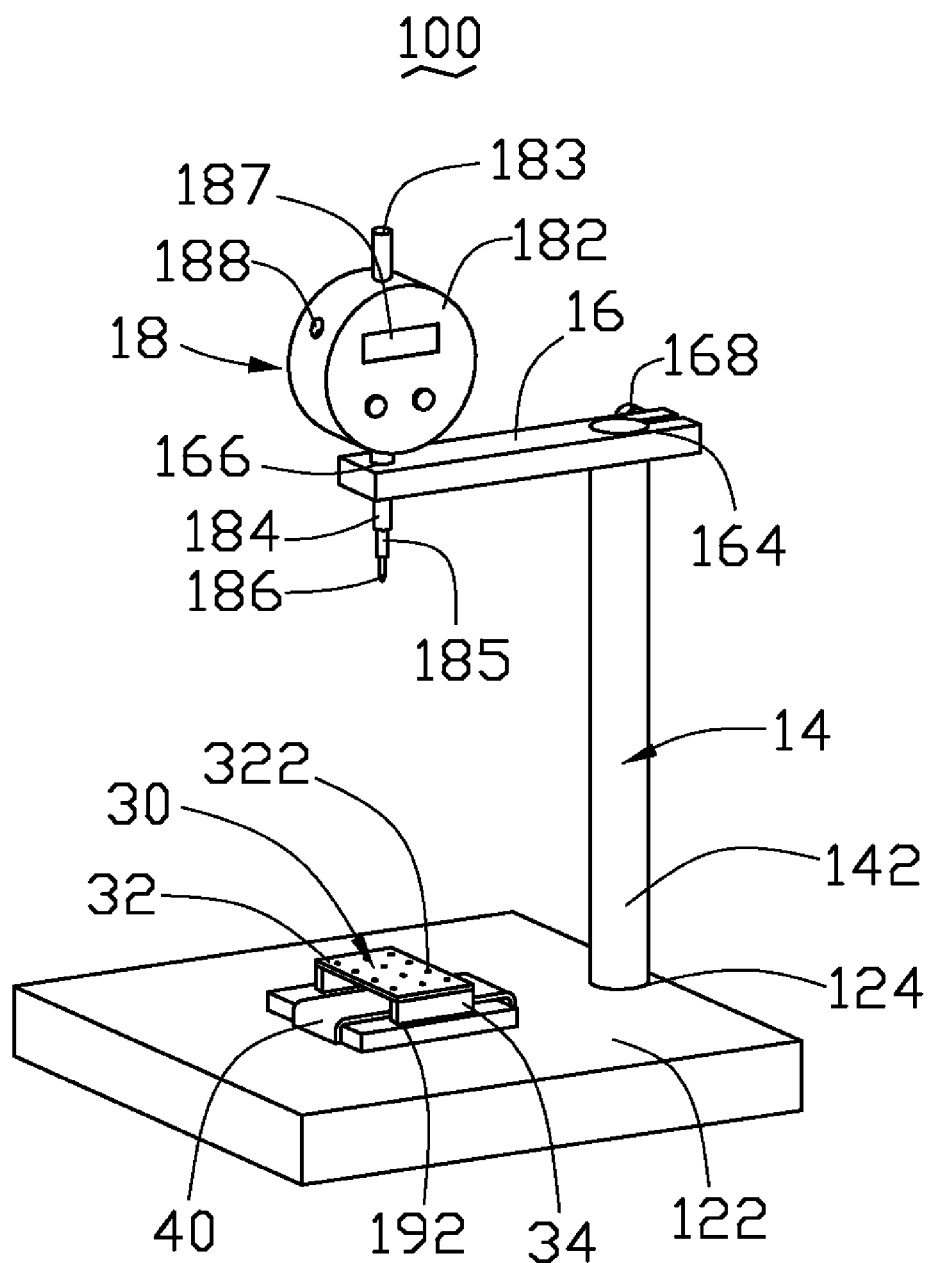
FIG. 2 is an isometric view of the measuring instrument shown in FIG. 1.
Figure 3:
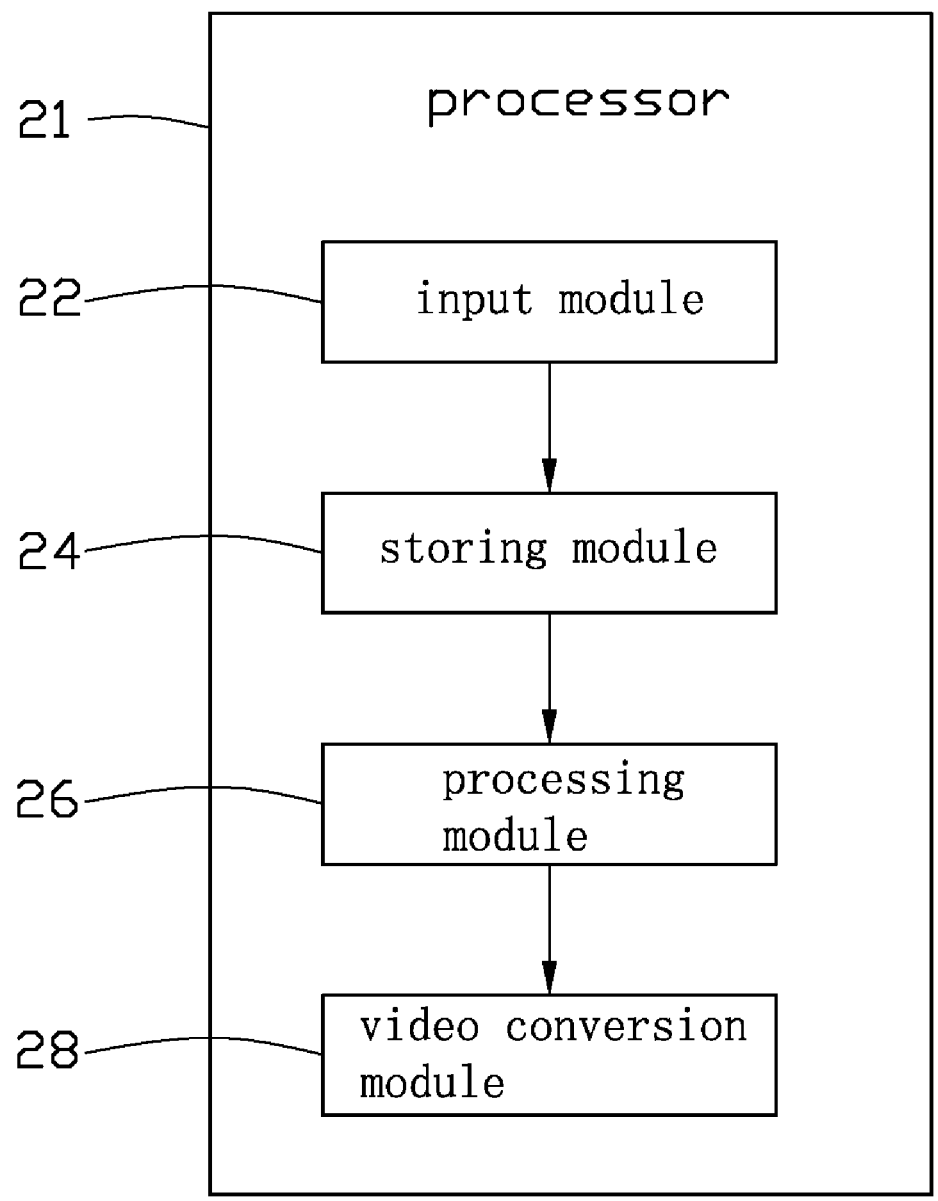
FIG. 3 is a flow chart of a processing device shown in FIG. 1.

Referring to FIG. 2, the base 12 is a rectangular flat board. The base 12 has an essentially flat upper surface 122, so that the holding member 19 may be flatly arranged on the upper surface 122, so as to reduce errors in measuring. The base 12 may, advantageously, be made of a metal with high density, such as stainless steel or the like, so that the weight and linear dimensions of the base 12 together are enough to keep the measuring instrument 10 balanced (i.e., the base 12 beneficially acts as a ballast for the measuring instrument 10). A fixing hole 124 is defined adjacent to an edge portion of the base 12.

The guide column 14 may, advantageously, be made of a durable, rigid material, such as stainless steel, copper alloy, or the like, so the shape of the guide column 14 may stay the same even after repeated usage. The guide column 14 has a smooth circumference surface 142 and is configured (i.e., structured and arranged) for allowing the sliding member 16 to be easily moved along the guide column 14. The guide column 14 is configured for engaging in the fixing hole 124 of the base 12.

The sliding member 16 is approximately a rectangular block, and has a guide hole 164 and a receiving hole 166 respectively defined at two ends thereof. The guide hole 164 has an approximately similar diameter to the guide column 14, for facilitating a slide fit therebetween. A bore (not shown) is defined in a sidewall of the sliding member 16 and is perpendicular to an axis of the guide hole 164. A slot/aperture 169 is defined across the sliding member 16 so as to form two portions beside the slot/aperture 169. The slot/aperture 169 enables the guide hole 164 to communicate with the surrounding environment. The width of the slot/aperture 169 is large enough that the two portions beside the slot/aperture 169 are moveable relative to the slot/aperture 169. The bore is divided into two parts portion by the aperture 169. An adjusting screw 168 is rotated into the bore to fastens the two opposite side portions of the slot/aperture 169. Therefore, the diameter of the guide hole 164 can be expanded or reduced by rotating the adjusting screw 168.

The digital micrometer 18 includes a main body 182, a sleeve 184 and a measuring shaft 185. The sleeve 184 is received in the receiving hole 166 of the sliding member 16 and is mounted on the main body 182 (e.g., the sleeve 184 is soldered/welded on the main body 182). The measuring shaft 185 has a contacting portion 186 at one end thereof. The measuring shaft 185 passes the sleeve 184 and extends through the main body 182, with the contacting portion 186 extending out from the sleeve 184. A cap 183 is mounted on another end of the measuring shaft 185 for lifting the measuring shaft 185. A dial plate 187, a zero reset button 1822 and a power button 1824 are set on the main body 182. The zero reset button 1822 and the power button 1824 are located under the dial plate 187. The dial plate 187 may display a movement distance of the contacting portion 186 of the measuring shaft 185 via pressing the zero reset button 1822. That is, the zero reset button 1822 is configured for selectably establishing a zero reference level or datum plane, to provide a basis for measurement. An output interface 188 is formed in a shell of the main body 182. The output interface 188 is used for transmitting dimensions data to the processing device 21.

The holding member 19 has a flat bottom surface (not labeled), so that the holding member 19 can be flatly arranged on the base 12. The holding member 19 is configured for fixing a workpiece 40. A reference-standard surface (not shown) is formed on the holding member 19, which is at a same horizontal level with an upper surface of a standard workpiece 40 fixed on the holding member 19. A cover 30 is fixed on the holding member 19 across/over the workpiece 40. The cover 30 has a top wall 32 and two sidewalls 34 vertically connecting with the two ends of the top wall 32. The two sidewalls 34 respectively engage in two gaps 192 defined in the holding member 19. A plurality of positioning holes 322 are defined across the top wall 32, configured for receiving the measuring shaft 185. The position of the positioning holes 322 is designed according to the shape of the workpiece 40 and, particularly, to one of the positioning holes 322 positioned above the reference-standard surface.

The processing device 20, which advantageously is a programmable logic controller (PLC) or a computer, is used to process the data from the measuring instrument 10 and show/display a testing result. The processing device 20 includes, at least, a processor 21 and a display 29. The processor 21 has an input module 22, a storing module 24, a processing module 26, and a video-conversion module 28. The input module 22 connects with the output interface 188 of the digital micrometer 18 is set to receive data (e.g., measured values) from the digital micrometer 18 via an electronic connection such as a data wire or a wireless link. The storing module 24 stores reference data and testing values transmitted from the digital micrometer 18 via the input module 22. The reference data is, for example, a series of numbers in a range (e.g., 0.1 mm). The processing module 26 is configured for receiving the data transmitted from the input module 22 and for processing and comparing it with the reference data, so as to generate a result. The video-conversion module 28 is used to receive the signal of the test result and transform it into a video signal. The video-conversion module 28 electronically connects (e.g., hard-wire or wireless link) with the display 29, so that the result might be display via the display 29. It is to be further understood that the processing module 26 could be linked to a printer (not shown), as well. Either way, the display 29 and/or the printer would serve as data output modules.

In use, firstly, an user inputs a reference range value of a height of a normal workpiece 40. The reference data is stored in the storing module 24. The workpiece 40 is fixed on the holding member 19, with the cover 30 mounted on the holding member 19 and over/across the workpiece 40. The holding member 19 with the workpiece 40 and the cover 30 thereon is then placed on the base 12.

The adjusting screw 168 is then rotated outwardly and the sliding member 16 moves downward. The user moves the holding member 19 so as to let the positioning hole 322 above the reference-standard surface correspond to the measuring shaft 185. When the contacting portion 186 of the measuring shaft 185 touches the reference-standard surface via the corresponding positioning hole 322, the sliding member 16 is tightened up by the adjusting screw 183. The power button 1824 and the zero reset button 1822 are pressed down in order written, and the dial plate 187 shows "0". The height of the reference-standard surface 192 is set to zero.

After that, the user lift up the measuring shaft 185 via the cap 183 while move the holding member 19 at the same time. When the measuring shaft 184 corresponds to another positioning hole 322 of the cover 30, the measuring shaft 184 is slowly released. The contacting portion 186 of the measuring shaft 185 touches the upper surface of the workpiece 40. The dial plate 184 shows/indicates the distance between the end of the contacting portion 186 and the reference-standard surface. When the point is lower/shorter than the reference-standard surface, the number/value is positive. Otherwise, when the end of the contacting portion 186 is higher/taller than the reference-standard surface, the number is negative. The signal corresponding to the number/value is transmitted to the input module 22 of the processor 21 via a data wire. The number/value is then restored in the storing module 24. Then repeat the steps above so as to test the other points of the upper surface of the workpiece 40 via the positioning holes 322. The numbers/values relative to the positioning points are then restored in the storing module 24.

The processing module 26 processes the numbers/values relative to the testing points of the upper surface of the workpiece 40 and generate a result. If the result is in the reference range, the display 201 will show "pass", indicating that the workpiece 40 is suitably dimensioned. Otherwise, if the result is out of the reference range, the display 201 will show "reject", which means the workpiece 40 has one or more dimensions that are not in the acceptable range.

It should be understood that the cover 30 on the holding member 19 may be omitted, and the holding member 19 may be directly moved without lifting the measuring shaft 185.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A measuring system for flatness degree measurement, comprising:

a measuring instrument including a base, a guide column, a sliding member, a digital micrometer and a holding member, the guide column being vertically attached to the base, the sliding member being moveably attached to the guide column, the digital micrometer being firmly fastened to the sliding member and generating measured values when performing measurement, the holding member being configured for fixing a workpiece and having a reference-standard surface formed thereon, the holding member being positioned on the base; and a processing device electronically connecting with the digital micrometer; and a cover attached to the holding member, the cover defining a plurality of positioning holes, and one of the positioning holes being defined over the reference-standard surface;

wherein the processing device receives the measured values generated by the digital micrometer and displays a testing result after processing the measured values.

2. The measuring system as claimed in claim 1, wherein the cover comprises a top wall and two sidewalls vertically connecting with two ends of the top wall, and the positioning holes are defined in the top wall.

3. The measuring system as claimed in claim 1, wherein the digital micrometer comprises a main body, a measuring shaft, a cap, and a sleeve, the measuring shaft passes the sleeve and extends through the main body, the cap covers one end of the measuring shaft, and the sleeve is firmly attached to the sliding member.

4. The measuring system as claimed in claim 3, wherein the digital micrometer further includes a zero reset button and a power button.

5. The measuring system as claimed in claim 4, wherein the digital micrometer further includes an output interface for transmitting measured values to the processing device.

6. The measuring system as claimed in claim 5, wherein the processing device comprises a processor and a display, the processor electronically connects with the output interface of the digital micrometer, and the display electronically connects with the processor.

7. The measuring system as claimed in claim 6, wherein the processor includes a storing module, and the storing module stores reference data and measured values transmitted from the digital micrometer.

8. The measuring system as claimed in claim 1, wherein a guide hole is defined in the sliding member, and the guide column is engaged with the guide hole.

9. The measuring system as claimed in claim 8, wherein the sliding member further comprises an aperture defined therein, and the aperture extends across the sliding member and permits the guide hole to communicate with the ambient.

10. The measuring system as claimed in claim 9, wherein a bore is defined in the sliding member, the bore communicates with the aperture, and an adjusting screw is engaged with the bore to facilitate adjustment of the diameter of the guide hole.

11. A method for measuring, comprising the steps of:
providing a measuring system, the measuring system including a measuring instrument and a processing device, the measuring instrument including a digital micrometer and a holding member, the holding member having a reference-standard surface formed thereon, the reference-standard surface being at a same horizontal level with an upper surface of a standard workpiece fixed on the holding member, the digital micrometer including a measuring shaft;
inputting reference data into the processing device;
setting a datum mark of the digital micrometer when the measuring shaft of the digital micrometer touches the reference-standard surface of the holding member;
measuring a plurality points of an upper surface of a workpiece using the measuring instrument so as to gain a plurality of measured values; and
using the processing device to deal with the measured values and determine a relation between the measured values and the reference data so as to yield a testing result.

12. The method as claimed in claim 11, wherein reference-standard surface cooperates with the digital micrometer of the measuring instrument so as to establish a zero reference level.

13. The method as claimed in claim 11, wherein a cover is attached to the holding member, the holding member includes a top wall, a plurality positioning holes are defined in the top wall, one of the positioning holes is positioned above the reference-standard surface, and the measuring shaft is passed through a corresponding positioning hole so as to touch the upper surface of the reference-standard surface.

14. A measuring system, comprising:
a measuring instrument including a base, a guide column, a holding member and a measuring assembly, the measuring assembly attached to the guide column, the measuring assembly including a digital micrometer moveably positioned above the holding member, the holding member being positioned on the base and having a reference-standard surface formed thereon, the reference-standard surface being at a same horizontal level with an upper surface of a standard workpiece fixed on the holding member; and
a processing device electronically connected with the digital micrometer;
wherein the processing device receives measured values from the digital micrometer and displays a testing result after processing the measured values.

15. The measuring system as claimed in claim 14, wherein the measuring assembly further comprises a sliding member, the digital micrometer is firmly attached to the sliding member, and the sliding member is flexibly attached to the guide column.

16. The measuring system as claimed in claim 15, wherein the sliding member has a guide hole and an aperture defined therein, and the aperture extends across the sliding member and permits the guide hole to communicate with the ambient.

17. The measuring system as claimed in claim 16, wherein a bore is defined in the sliding member, the bore is divided into two parts by the aperture, and an adjusting screw is engaged with the bore for selectably adjusting the diameter of the guide hole.

18. The measuring system as claimed in claim 14, further comprising a cover, wherein the cover is attached to the holding member and defines a plurality of positioning holes, and one of the positioning holes is defined over the reference-standard surface.

19. The measuring system as claimed in claim 18, wherein the cover comprises a top wall and two sidewalls vertically connecting with two ends of the top wall, and the positioning holes are defined in the top wall.

* * * * *